US008167602B2

(12) United States Patent
Hartner

(10) Patent No.: US 8,167,602 B2
(45) Date of Patent: May 1, 2012

(54) COMPACTING TOOL

(75) Inventor: Johannes Hartner, Laakirchen (AT)

(73) Assignee: Miba Sinter Austria GmbH (AT)

( * ) Notice: Subject to any disclaimer, the term of this patent is extended or adjusted under 35 U.S.C. 154(b) by 778 days.

(21) Appl. No.: 12/270,984

(22) Filed: Nov. 14, 2008

(65) Prior Publication Data

US 2009/0257905 A1 Oct. 15, 2009

(30) Foreign Application Priority Data

Nov. 14, 2007 (AT) .................................. A 184/2007

(51) Int. Cl.
*B29C 43/04* (2006.01)

(52) U.S. Cl. ..................... 425/193; 425/195; 425/450.1; 425/451.2; 425/451.7; 425/577; 425/589

(58) Field of Classification Search .................... 72/468; 425/193, 195, 330, 450.1, 451.2, 451–7, 425/468, 577, 589, 590, 450, 451.7
See application file for complete search history.

(56) References Cited

U.S. PATENT DOCUMENTS 3,555,607 A * 1/1971 Epain et al. ..................... 425/77
3,691,816 A * 9/1972 Strandell ......................... 72/467
3,822,974 A * 7/1974 DeSantis et al. ................ 425/78
3,909,167 A * 9/1975 Signora ........................... 425/78
4,906,434 A * 3/1990 Ashbee ........................... 419/51
5,694,640 A * 12/1997 Greetham ....................... 425/78
6,186,763 B1 * 2/2001 Scanlan ........................ 425/195
6,314,787 B1 11/2001 Grønbæk
2004/0137100 A1 7/2004 Silbermann et al.
2007/0062244 A1 3/2007 Good et al.

FOREIGN PATENT DOCUMENTS

DE 321659 6/1920
DE 19804700 8/1999
EP 1422050 5/2004
GB 20679 1/1916
WO 2005/039805 5/2005

OTHER PUBLICATIONS

Office Action pertaining to priority Austrian Patent Application No. A 1840/2007, 2 pages.

* cited by examiner

*Primary Examiner* — Richard Crispino
*Assistant Examiner* — Thukhanh Nguyen
(74) *Attorney, Agent, or Firm* — Lerner, David, Littenberg, Krumholz & Mentlik, LLP

(57) ABSTRACT

The invention relates to a tool (3) for compacting a sintered component or a powder for the sintered component, with a clamping element (10) and a compacting element (11) which can be radially adjusted in terms of its dimensions, with a contact surface for the sintered component or powder, which has a surface complementing the surface of the sintered component to be produced, and the clamping element (10) has an oblique first surface (12) and the compacting element (11) has an oblique second surface (13) complementing it, and the first and the second oblique surface (12, 13) co-operate in order to prise apart and open or make smaller the compacting element (11), and the clamping element (10) and/or the compacting element (11) can be displaced in the axial direction, and a support element (9) is provided if necessary.

30 Claims, 10 Drawing Sheets

COMPACTING TOOL

BACKGROUND OF THE INVENTION

The invention relates to a tool for compacting a sintered component or a powder for the sintered component, a pressing device for compacting a sintered component or a powder for the sintered component, with at least one press element for applying the compaction pressure and with a tool for compacting the sintered component into which the sintered component can be introduced and which is disposed between a top punch and a bottom punch, a method of compacting a powder to form a sintered component in a tool, whereby the powder is introduced into the tool and compressed in it, as well as a method of compacting a sintered component with a tool of a pressing device, whereby the sintered component is introduced into the tool and compressed in it.

These days, sintered components, in particular sintered gears—within the meaning of the invention, the term gear is intended to mean both a gear as such and a cogged belt wheel or chain wheel—are produced by pressing a powder, for example a metal powder or a powder containing an alloy to form what is referred to as a green compact, which may then be pre-sintered if necessary, additionally pressing the green compact in order to increase the density in layers close to the surface, feeding it to a calibration process also operated under pressure in order to increase the dimensional accuracy of the sintered component if necessary, after which the green compact is sintered and fed to another calibration process after sintering if necessary.

SUMMARY OF THE INVENTION

The objective of this invention is to enable sintered components, in particular sintered gears and sintered components incorporating toothing, to be manufactured more cost-effectively.

This objective is achieved by means of the tool mentioned above, which has a clamping element and a compacting element which can be radially adjusted in terms of its dimensions and has a contact surface for the sintered component or powder which is designed as a surface complementing the surface of the sintered component to be produced in the contact region, and the clamping element has an oblique first surface and the compacting element has an oblique second surface complementing it, and the first and the second oblique surface co-operate in order to prise apart and widen or make smaller the compacting element, and the clamping element is displaceable in the axial direction and also optionally has a support element, and, independently of the above, this objective is achieved by the pressing device mentioned above which incorporates the tool based on the invention, as well as by the method of compacting a powder to form a sintered component and by the method of compacting a sintered component, for which purpose a tool proposed by the invention is used, and the contour of the sintered component is set before or after introducing the powder by prising apart and opening or making smaller the compacting element by means of the at least one first and at least one second oblique surface by displacing at least a part of the clamping element in the axial direction, or the contour of the sintered component is set before or after introducing the sintered component by prising apart and opening or making smaller the compacting element by means of the at least one first and the at least one second oblique surface by displacing at least a part of the clamping element in the axial direction.

The advantage of this approach is that with this tool and using this method, sintered components can be manufactured with a contour which has a very high degree of accuracy, and the processes of both compacting and calibrating the sinter powder or sintered components takes place in one operation so that, compared with the prior art, at least one work operation is dispensed with, namely calibrating the compacted sintered component, for example by rolling, thereby resulting in a corresponding reduction in costs due to the shorter work sequence and due to the savings made on tool costs by reducing the number of tools needed. In the case of so-called multiple gears where several different sets of teeth are provided on one gear, it is now even possible to save on several work operations using the tool proposed by the invention because it is normally necessary to produce each set of teeth separately. With this method, therefore, it is specifically possible to manufacture gears with a very high degree of accuracy in terms of concentricity. On the other hand, it is naturally also possible, by using an appropriate geometry for the tool, to make so-called out-of-the-round gears and chain wheels and sintered components with more complex geometries which are needed in a variety of applications, for example in transmissions and engines. Also with this tool, by adapting the compacting element accordingly, it is also possible to produce sintered components and gears which have an undercut, as well as multiple gears where the individual sets of teeth are separated from one another by so-called flanges. The sintered components can be manufactured without reducing the number of strokes of the press die, which means that only the tool has to be replaced on existing systems and there are no other limitations to the production process. Furthermore, the tool is inexpensive to manufacture and replacement tools can be procured quickly and inexpensively should it become necessary to replace a tool. Due to the design of the tool, it is very versatile in terms of different geometries of sintered components because only the compacting element needs to be replaced. The tool can therefore be fully integrated in an existing calibration process. A surface compaction can be operated at the same time as the sintered component is being calibrated. Due to the simplicity of the tool, fitting operations are less complex, thereby enabling downtimes to be reduced. Using the tool, however, it is possible to improve the process in terms of reproducibility by increasing the service life of the tool. Moreover, it is possible to run an least more or less isostatic compaction, which makes compaction of the powder and the sintered component more homogeneous and thus makes the property portfolio of the sintered component likewise more homogeneous.

At least one guide element may be provided on or in the clamping element, which has an external thread which locates in an internal thread of the clamping element. This enables the pre-tensioning of the compacting element to be adjusted very easily and accurately.

The clamping element may have at least one first clamping element part and at least one second clamping element part, which are disposed one above the other in the axial direction, and the second clamping element part has an inclined other oblique surface which complements the first oblique surface, and the compacting element has the second oblique surface and another inclined oblique surface complementing it, and the first oblique surface of the clamping element co-operates with the second oblique surface of the compacting element and the other oblique surface of the clamping element co-operates with the other oblique surface of the compacting element. In particular, the compacting element may be designed as a double cone element. On the one hand, this enables the accuracy of the sintered component to be improved in that any tilting of the inner surface, i.e. the mould surface of the compacting element, with respect to the vertical is avoided or can be compensated. On the other hand, the exact opposite is possible, in which case the individual oblique surfaces can be fed in such a way as to permit such a tilting of a surface of the compacting element lying in contact with the sintered component or sinter powder to be compacted, thereby enabling gears and sintered components to be produced which—as viewed in the axial direction—have a frustoconical external surface in the region of a set of teeth. This further increases the adjustability of the tool in terms of the types of sintered components to be produced. The oblique surfaces can have the same value in terms of angle of inclination and designs are also possible whereby the absolute values of the angles of inclination are different from one another.

At least one spring element may be disposed between the first clamping element part and the second clamping element part, for example a spring or, as with another embodiment of the invention, spring bellows, made from an elastomer in particular. In addition to the guide element, this ensures that the two clamping element parts are spaced more or less equally apart from one another across their entire circumference, including when pressure is being applied in the press, which makes it easier to prevent the compacting element from moving out of line or tilting and the density or density curve in the sintered component can be made uniform.

The first clamping element part may be provided in the form of a cone element with an external cone and the second clamping element part may be provided in the form of at least one splined disc with an internal cone, and the compacting element has an internal cone which locates with the external cone of the cone element and an external cone which locates with the splined disc(s), thereby providing a simple means of enabling inner undercuts to be produced with a tool which does not require much maintenance, e.g. internal sets of teeth.

In order to assist the expansion of the compacting element, it may be provided with at least one V-shaped groove.

In order to assist and facilitate the task of setting up the compacting element correctly for the sintered component to be produced, slot-shaped orifices extending in the radial direction may be provided, which may optionally have a bore or cut-out in the axial direction in at least one of their ends with a diameter which is bigger than a width of the slot-shaped orifices.

In the case of the embodiment of the invention designed for producing a sintered gear, the compacting element may have toothing with tooth heads at its contact surface for the sintered component or powder and tooth roots disposed in between which complement a set of teeth of the sintered component.

This being the case, the slot-shaped orifices may be disposed so that they extend from a boundary surface of the compacting element lying opposite one of the sets of teeth of the compacting element in the radial direction as far as a region of the addendum circle and/or root circle of the toothing of the compacting element and, in another embodiment, the slot-shaped orifices may extend in the region of the addendum circle of the compacting element in the radial direction starting from the boundary surface of the compacting element lying opposite the toothing of the compacting element in the radial direction but at most only as far as the region of the root circle. This also enables a particularly fine accuracy of the setting of the internal diameter or internal dimensions of the compacting element to be obtained, which is particularly important for the sintered component to be produced and the variability of the setting options can be increased.

In order to reduce tensions in the compacting element induced by the closing of the clamping element, it is of advantage if ends of the slot-shaped orifices which lie closest to the root circle of the toothing of the compacting element are provided with a bore or cut-out in the axial direction.

It is also possible for the slot-shaped orifices in the region of the root circle to terminate before the boundary surface of the compacting element lying opposite the toothing of the compacting element in the radial direction, thereby improving the mutual co-operation of the individual slot-shaped orifices.

It should be pointed out in particular that these slot-shaped orifices also enable a flank compaction to be set up.

A depth of the slot-shaped orifices in the axial direction extending radially as far as the region of the root circle may be selected from a range with an upper limit of up to 10% of a total height of the compacting element in the axial direction. Amongst other things, this makes it easier to adjust the addendum circle diameter of the gear to be produced and adjust the tooth geometry. In this respect, these slot-shaped orifices need not necessarily extend as far as the lateral surface of the compacting element.

At least individual ones of the slot-shaped orifices may be provided with an anti-friction coating in at least certain regions of their surface, which is preferably provided in the form of rubberised areas or an anti-friction substance such as calibrating oil, polytetra-fluoroethylene, etc. This at least largely prevents the sinter powder from being able to penetrate the open, slot-shaped orifices due to the pressing pressure but if this does happen, this powder can be easily removed from the orifices by pressurised air or by rinsing, for example with a rinsing medium.

Another way of covering these slot-shaped orifices and thus preventing the sinter powder from getting into them is to provide an insert element over the contact surface of the compacting element, e.g. a sleeve, which may also conform to the toothing. This insert element may naturally also be provided with an anti-friction coating.

At least one cut-out for accommodating a tool insert for producing undercuts on the sintered component may be provided in the insert element and/or compacting element. This increases variability in terms of the different geometries of sintered components which can be produced.

The tooth heads of the toothing of the compacting element may be provided with a cut-out or recess in order to provide a buffer volume for material which flows out during the pressing operation, thereby preventing the teeth from being made bigger. Naturally, such cut-outs or recesses may also be provided for the same reason when producing other sintered components, e.g. sintered components which do not have toothing.

The compacting element may be made up of individual, plates or segments disposed adjacent to one another, in which case this compacting element can be assembled in different ways in the manner of a kit on the one hand and, on the other hand, if only individual ones of these plates or segments become damaged or worn whilst the tool proposed by the invention is in operation, only individual plates or segments have to be replaced rather than the entire compacting element as such.

To improve the positioning and securing of the plates or segments, groove-shaped cut-outs may be provided in the plates or segments, e.g. in the form of a dovetail, in which case complementary raised areas are provided, and these are disposed so that when the compacting element is in the assembled state, a raised area of a plate or segment locates in the cut-out of another plate or segment disposed adjacent to it, or, in another embodiment, the plates or segments may have cut-outs which can be inserted in the guide elements. This also facilitates assembly of the compacting element, although it would also be possible within the scope of the invention to opt for embodiments in which the plates or segments are held together by means of a clamp retaining them from outside. In this case, an appropriate recess may be provided in the plates or segments or in the clamping element for accommodating this clamp, thereby enabling an at least more or less full-surface contact of the compacting element on the clamping element.

Depending on whether a sintered component with internal toothing or external toothing is being made using the tool proposed by the invention, the clamping element may be disposed between the support element and the compacting element or the compacting element may be disposed between the support element and the clamping element—as viewed in the radial direction—which enables the versatility of the tool proposed by the invention to be increased.

The oblique surfaces of the tool may have an inclination towards a normal in the axial direction, which is selected from a range with a lower limit of 10° and an upper limit of 30°, in which case the force needed to compact the sinter powder or sintered component can be varied. Due to the shorter distance, a flatter inclination enables a stronger force to be used and a bigger inclination enables a correspondingly lower force to be applied. This enables the compaction pressure to be varied.

Due to the fact that the compacting element can be set up exactly in the tool proposed by the invention, it is possible to produce several parts simultaneously in this tool to a correspondingly high degree of accuracy, to which end the compacting element may be of a corresponding height in the axial direction.

Alternatively, several tools proposed by the invention may be disposed adjacent to one another or one above the other in the pressing device proposed by the invention to enable the compaction process to be run in steps and thus further increase the density in the sintered component to be produced. Using the tool, it is generally possible to obtain a more or less full density in the sintered component itself, in other words not just in the outer regions of such sintered components as is the case in the prior art. Providing several tools in a pressing device proposed by the invention or at different stations makes it easier to come close to obtaining the full density of the sintered component. As a result, it is also possible to produce and compact several sintered components simultaneously by means of several tools disposed one above the other.

At this stage, it should be pointed out that it is also naturally possible, within the scope of the invention, to run the compaction process so that a density gradient is imparted to sintered components starting from their outer surface which may optionally be provided with toothing, or in the case of inner toothing the inner surface, in the direction towards the respective oppositely lying surface, for example in order to produce sintered components which have a corresponding hardness at the toothing surface and a higher elasticity at another surface.

Another possible option for the pressing device proposed by the invention is one in which the bottom punch has a V-shaped web which locates in the V-shaped groove of the tool, thereby automating expansion of the compacting element.

Finally, it is possible to provide guide elements, in particular die plates, above and/or below the tool. This provides a better horizontal guiding action when the diameter of the compacting element is adjusted, in which case the guide elements in the clamping element may optionally be dispensed with.

The invention further relates to the use of the tool to produce a sintered component with external toothing and/or with internal toothing.

BRIEF DESCRIPTION OF THE DRAWINGS

To provide a clearer understanding, the invention will be described in more detail below with reference to the appended drawings.

These respectively provide highly simplified, schematic diagrams of the following.

DETAILED DESCRIPTION

Figure 1:
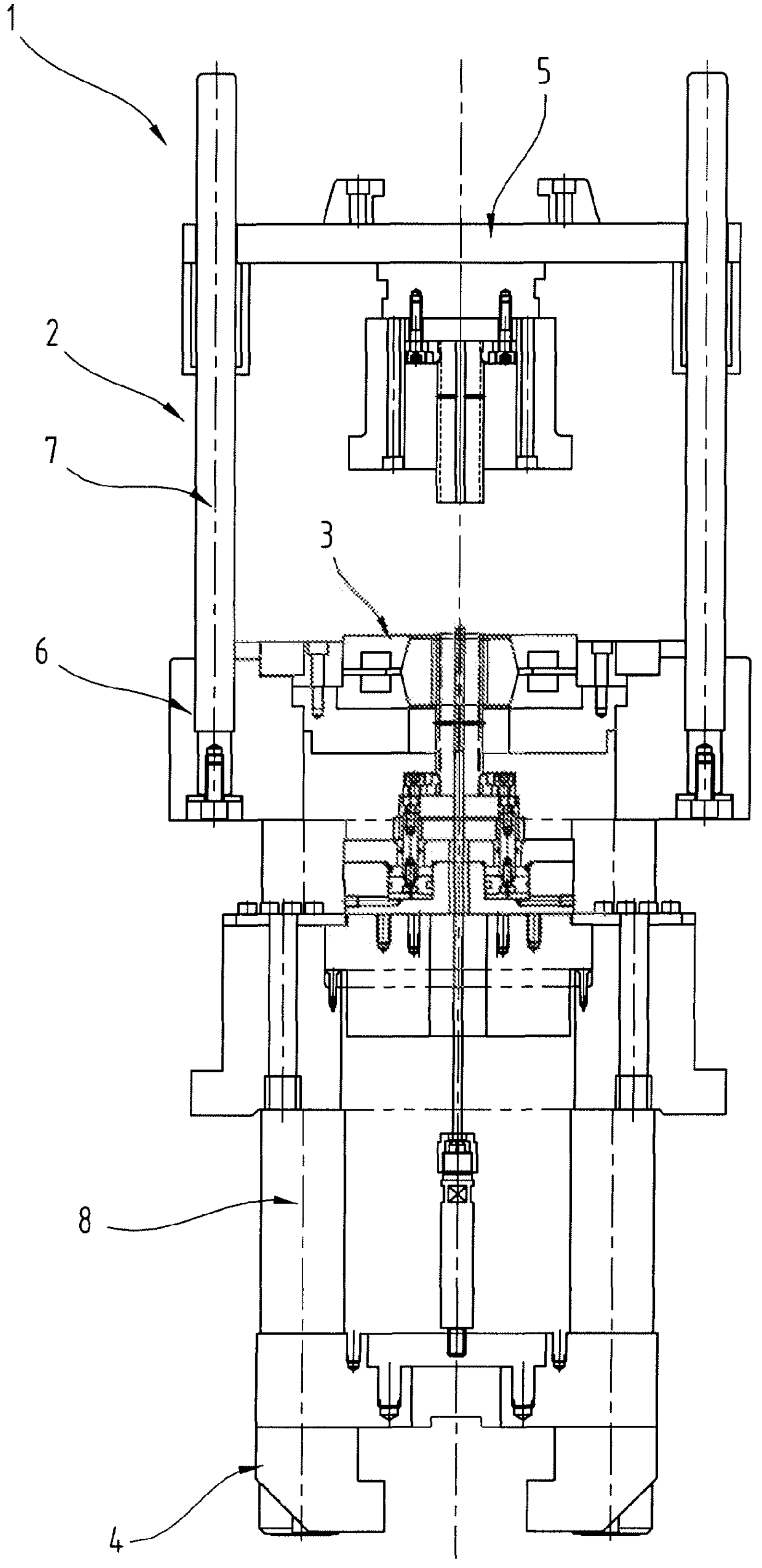
FIG. 1 is a pressing device in the open position with the tool proposed by the invention.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

FIG. 1 illustrates a pressing device 1 comprising a press element 2 for applying the compaction pressure and a tool 3 for compacting at least the toothing of a sintered component or a sinter powder. The press element 2 has a bottom punch holder 4 with a bottom punch, a top punch holder 5 with a top punch, and a tool holder 6. The bottom punch holder 4 and/or the top punch holder 5 and/or the tool holder 6 are retained by posts 7, 8 and may be designed to slide vertically along them. Since such a pressing device 1, with the exception of the tool 3, is already known from the prior art, no further explanation is needed at this point and the person skilled in the art may refer to the relevant background literature.

Figure 2:
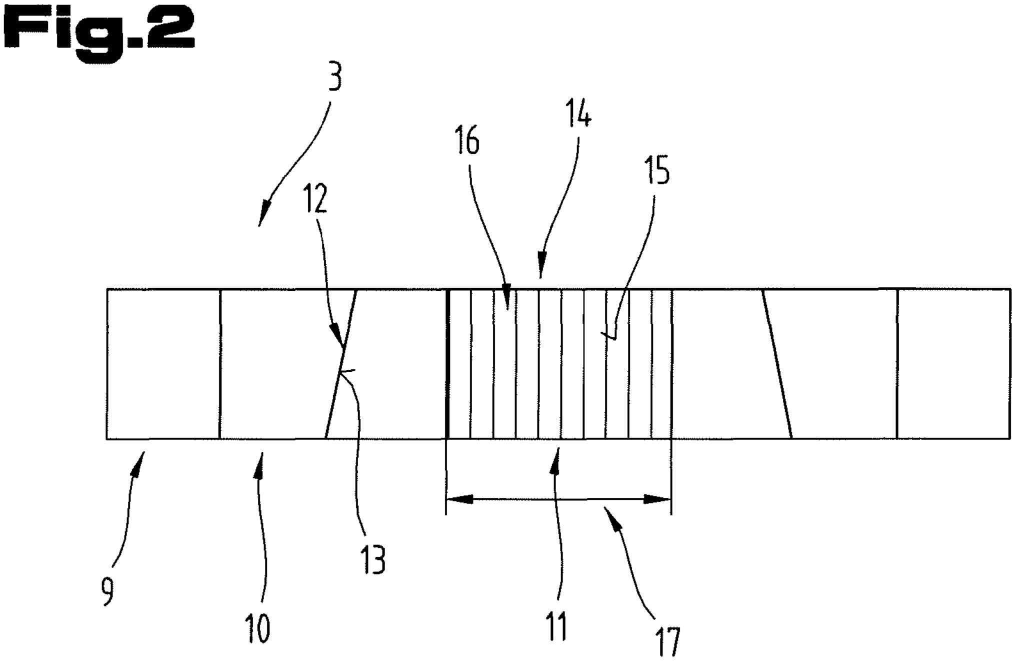
FIG. 2 is a side view in section illustrating a first embodiment of the tool.

FIG. 2 is a cross-section illustrating a first embodiment of the tool 3. This tool 3 comprises a support element 9, a clamping element 10 and a compacting element 11. The support element 9 is retained by the tool holder 6 so that it is unable to move. The clamping element 10 has a first oblique surface 12, which co-operates with a second oblique surface 13 of the compacting element 11, and this second oblique surface 13 has an inclination which complements that of the first oblique surface 12 so that the two elements, i.e. the compacting element 11 and the clamping element 12, can be displaced relative to one another along these two oblique surfaces 12, 13.

Although a separate support element 9 is illustrated with this embodiment, this is not absolutely necessary for the tool because the support may also be provided exclusively by the tool holder 6, for example, and it may be that separate support is not necessary, i.e. the support is provided by the tool itself.

The compacting element 11 has an internal opening 14 with toothing 16 on its surface 15. This toothing 16 complements toothing on a sintered component so that with the aid of the compacting element 11, the toothing of the sintered component can be compacted and the sintered component itself generally can be compacted and, if using a sinter powder, compressed, and the geometry of the sintered component can be set by means of this toothing 16.

The sinter powders may be sintering steels, powders containing iron, copper or metals generally or metal alloys, for example, and it should be pointed out at this stage that the invention is not restricted to one particular material.

A diameter 17 of the opening 14 can be set by means of the two oblique surfaces 12, 13 and the relative axial displacement which can be achieved between the compacting element 11 and the clamping element 10, thereby increasing the accuracy of the sintered components to be produced. With the aid of the oblique surfaces 12, 13, it is also possible to compensate for tilting of the compacting element 10 with respect to a normal in the axial direction or to deliberately assist such tilting, depending on which sintered components are being produced.

At this point, it should be mentioned that the expression sintered components is primarily intended to mean sintered components which have toothing, and this toothing may be disposed both internally and externally on the sintered component, in other words internal toothing or external toothing can be produced. Examples of these are gears, cogged belt wheels, chain wheels, sliding couplings, coupling bodies of sintered components with inserts, i.e. components made from a material that is different from that of the sintered component and which is retained in it, synchroniser hubs, links to drive shafts, and in the latter case it is also possible to improve strength in the sintered component, due to the high density, using the tool proposed by the invention and the method proposed by the invention. Gears with a toothing crown may also be produced, i.e. with a camber in the width. The tool 3 proposed by the invention may also be used to produce sintered components with undercuts, for example gears with flanges or so-called integral multiple gears, in which case these gears have several sets of different teeth.

In addition to using the tool 3 proposed by the invention for directly compressing sinter powder containing both metals and metal alloys, optionally with other additives used as standard when manufacturing sintered components, it may also be used in particular for the final compaction and calibration in a single step of previously pressed, sintered component semi-finished products. These semi-finished products may have already been pre-sintered.

Figure 3:
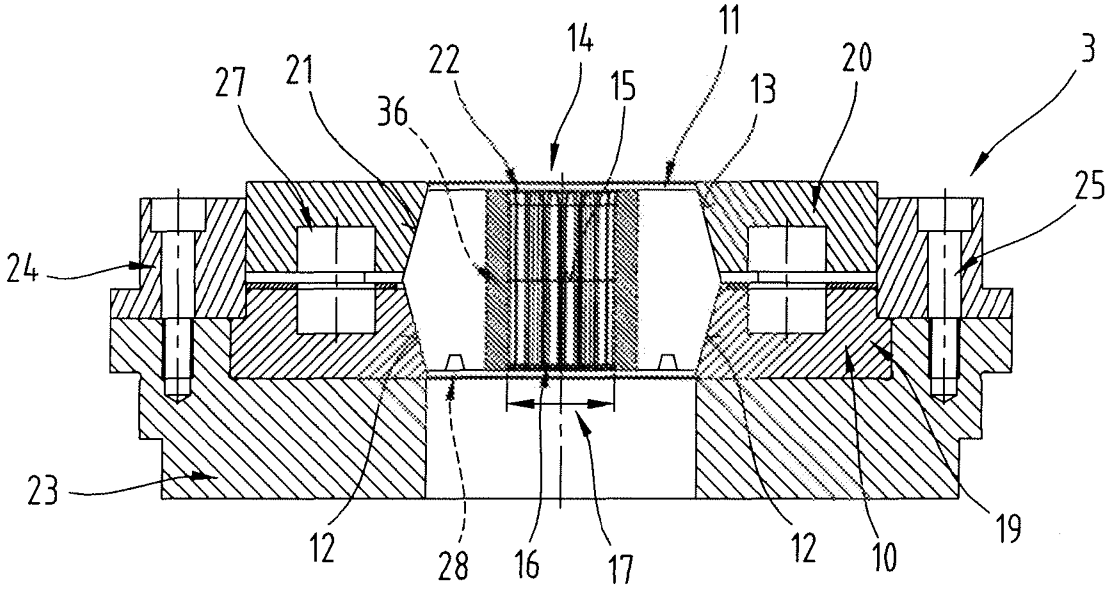
FIG. 3 is a side view in section illustrating another embodiment of the tool.
Figure 4:
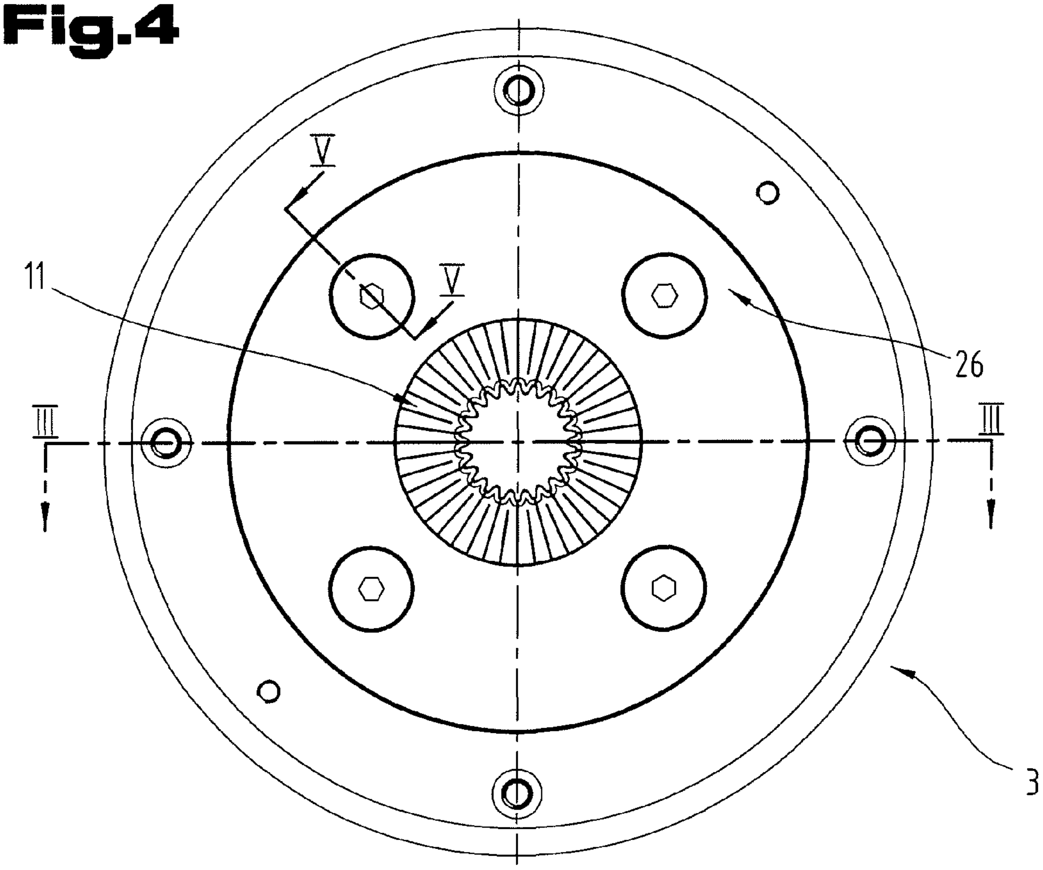
FIG. 4 is a plan view of the tool illustrated in FIG. 3.

FIGS. 3 and 4 illustrate this tool 3 in a side view in section and in a plan view, mounted in the pressing device 1 illustrated in FIG. 1. In this embodiment of the tool 3, the compacting element 11 is provided in the form of a double cone element, which, in addition to the oblique surface 13, has another oblique surface 18 with an inclination towards a normal in the axial direction that is the opposite of that of the first oblique surface 13. In particular, these two inclinations may be of the same size, in other words subtend the same angle in terms of value, although embodiments are also possible in which these angles are based on different amounts from one another, i.e. values.

The associated clamping element 10 in this embodiment comprises two parts with a first bottom clamping element part 19 and a second top clamping element part 20. The first bottom clamping element part 19 has the first oblique surface 12, the inclination of which complements that of the oblique surface 13 of the compacting element 11, and the second clamping element part 20 also has an oblique surface 21, which complements the other oblique surface 18 of the compacting element 11 and co-operates with it.

The two clamping element parts 19, 20 can be displaced relative to one another in the axial direction of the tool 3, which enables the compacting element 11 to be set more accurately and which in particular also enables any tilting of the internal surface 15 of the compacting element 11 incorporating the toothing 16 towards the normal in the axial direction to be better compensated or corrected. As a result, the accuracy of sintered components with sets of teeth can be improved in terms of concentricity, in particular gears, and—since the tool 3 proposed by the invention can be used to make so-called out-of-the-round gears—an out-of-the-round contour can also be set with a higher degree of accuracy.

To make it easier to introduce sintered component semi-finished products that have already been pre-pressed into the compacting element 11, the diameter 17 of the opening 14 of the compacting element 11 in a receiving region 22 may diverge in an at least approximately conical arrangement, as may be seen from FIG. 3. However, it should be pointed out that this feature is not absolutely necessary for the tool 3 proposed by the invention.

In the case of the design of tool 3 illustrated in FIG. 3, the support element 10 also comprises two parts with a bottom support element part 23 and a top support element part 24 which can be connected to the bottom support element part 23 so that it is not able to move, for example by means of screws 25. The top support element part 24 is designed so that it projects out from the bottom support element part 23 in the direction towards the clamping element 10 and the bottom clamping element part 19 has a corresponding projection in the direction towards the support element 9 so that the bottom clamping element part 19 can be clamped in certain regions between the two support element parts 23, 24 to prevent it from moving, so that only the top clamping element part 20 can be displaced vertically relative to the bottom clamping element part 19.

Figure 5:
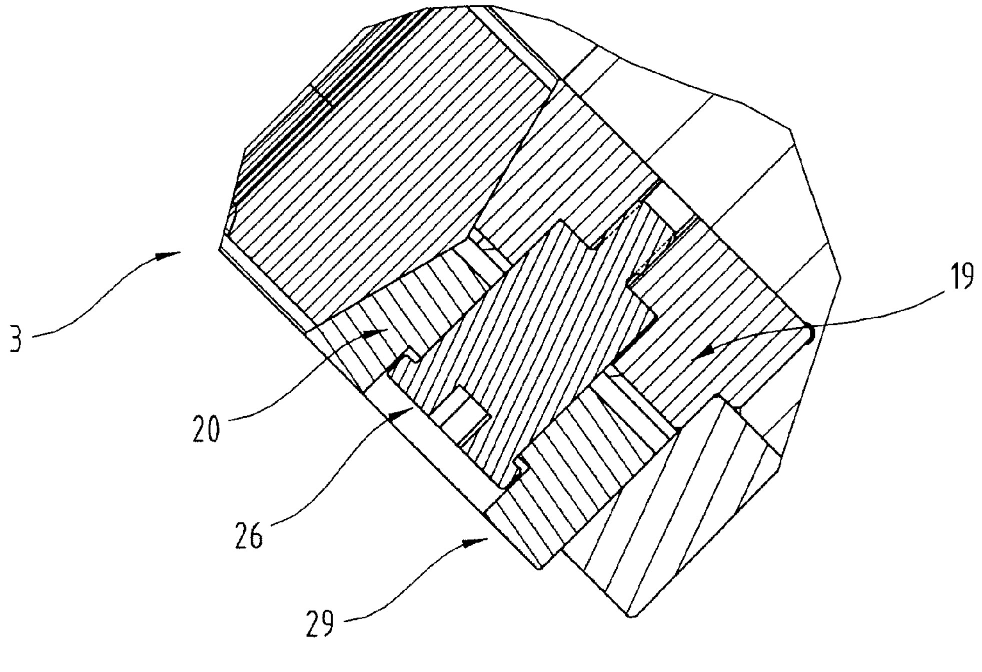
FIG. 5 is a side view in section showing a detail of the tool illustrated in FIG. 3.

As may be seen from FIGS. 4 and 5, four guide elements 26 in the form of screws are provided on the clamping element 10 in this embodiment, which have an external thread which locates in an internal thread of the clamping element 10, in particular of the bottom clamping element part 19. By means of these guide elements 26, the vertical position of the top clamping element parts 20 can be fixed relative to the bottom clamping element part 19, thereby enabling the setting of the compacting element 11 to be fixed.

It should be pointed out that, although the embodiment illustrated in FIGS. 3 to 5 is provided with four guide elements 26, it would naturally also be possible to provide a different number of guide elements 26, for example 3, 5, 6, etc.

To make it easier to fix the relative position of the top clamping element part 20 with respect to the bottom clamping element part 19, it is of advantage if, as illustrated in FIG. 3, at least one spring element 27 is provided between them, for example a conventional spring or preferably spring bellows, at least a part of which is made in particular from an elastomer. With this latter variant, it is possible to set the force by which these spring elements 27 oppose the movement of the top clamping element part 20 via the guide elements 26, at least within certain limits.

Again, four spring elements 27 may be provided in particular, which are disposed between the guide elements 26 (as viewed in the circumferential direction) as illustrated in FIG. 4. It is also possible to provide more or fewer of these spring elements 27, for example 3, 4, 5 or such like.

As indicated by broken lines in FIG. 3, a circumferentially extending V-shaped groove 28 may be provided in the bottom region of the compacting element 11 to simplify or facilitate expansion of this compacting element 11. In particular, an appropriately V-shaped, circumferentially extending web of the tool holder 6 of the pressing device 1 (FIG. 1) may be designed to locate in this V-shaped groove 28. By means of this V-shaped groove 28, the bottom clamping surface of the opening 14 can also be changed or adjusted, in addition to making an adjustment by means of the oblique surfaces 12, 13.

FIG. 5 illustrates a detail of the tool 3, showing the guide element 26 in particular, which locates by means of an external thread in an internal thread of the bottom clamping element part 19, and the top clamping element part 20 preferably has a stop 29 in order to restrict the vertical displacement of the guide element 26, and this stop 29 is also used to move the top clamping element part 20 by horizontally displacing the guide element 26 towards the bottom clamping element part 19.

Figure 6:
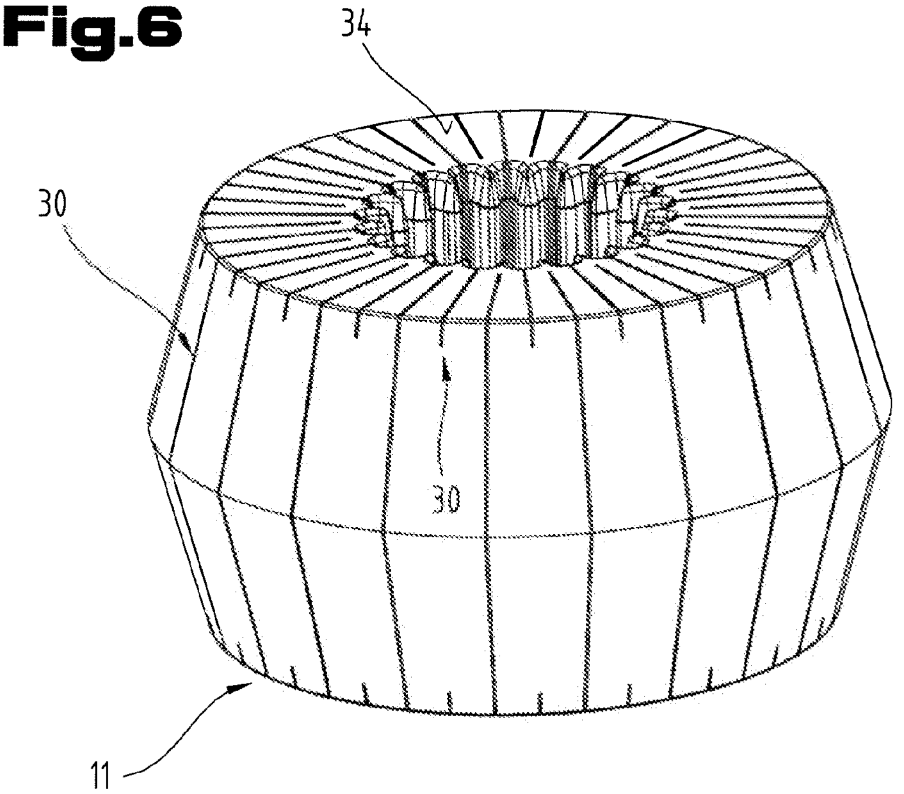
FIG. 6 is a view from an angle illustrating the design of a compacting element in the form of a double cone.
Figure 7:
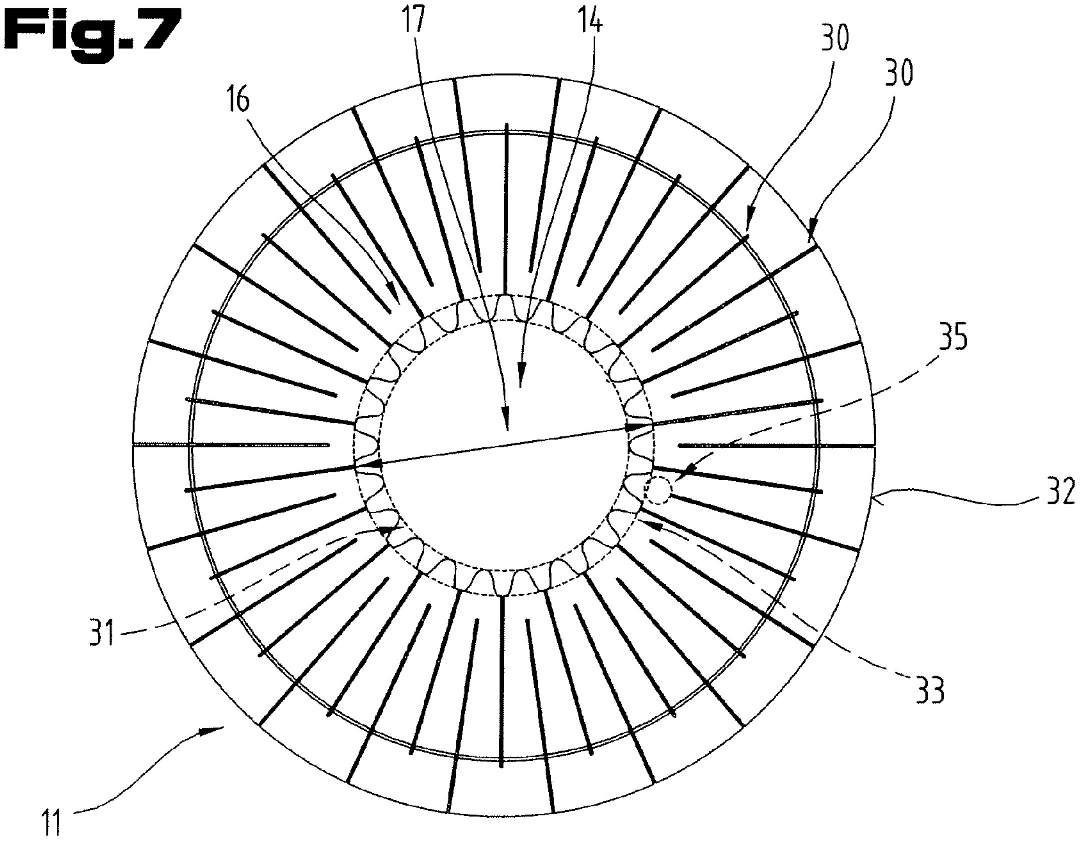
FIG. 7 is a plan view of the compacting element illustrated in FIG. 6.

FIGS. 6 and 7 show a view of the compacting element 11 from an angle and a plan view. In particular, these two drawings illustrate the slot-shaped orifice 30 which permits the displacement and thus enables the diameter 17 of the opening 14 to be adjusted more easily and more accurately. These FIGS. 6 and 7 illustrate several different slot-shaped orifices 30, in particular slot-shaped orifices 30 which extend at a distance from an addendum circle 31 of the compacting element 11 in the radial direction towards an oppositely lying boundary surface 32 of the compacting element 11. As illustrated in FIG. 7, these orifices 30 may extend from the region of the addendum circle 31 but at most only as far as a region of the root circle 33. In addition, slot-shaped orifices 30 may extend from the root circle 33 in the radial direction towards the boundary surface 32, in which case the orifices 30 are open in the direction of the opening 14 of the compacting element 11.

Those orifices 30 which extend in the direction towards the tooth heads of the toothing 16 run across the entire height of the compacting element 11, as may be seen from FIG. 6.

As also illustrated in FIG. 6, the orifices 30 which extends from the region of the root circle 33 in the radial direction towards the boundary surface 32 do not extend across the entire height of the compacting element 11 and these may run in the axial direction, starting from an external end face 34 of the compacting element 11, across a height or depth selected from a range with an upper limit of 10% of the total height of the compacting element 11 in the axial direction. This depth may therefore be between 0% and 10%.

At least individual ones of these slot-shaped orifices 30 may have a bore 35 at their end region, thereby improving the release of tension. These bores 35 may extend end to end through the compacting element 11 or across a part of the height of the compacting element 11, starting from one or both end faces 34 of the compacting element 11.

At this stage, it should be pointed out that the orifices 30 may also have bores at the outer ends—as viewed in the radial direction—with a view to releasing tension.

It would naturally also be possible to opt for a different layout of these orifices 30 from that illustrated in FIGS. 6 and 7. For example, orifices 30 might only be provided in the region of the tooth heads or the tooth roots of the toothing 16. Alternatively, the slot-shaped orifices 30 could also be of a different geometric shape, for example V-shaped or similar. These orifices 30 are preferably made using so-called wire erosion but could also be produced by other mechanical processes.

The compacting element 11 may also be made up of individual plates or individual segments, in which case a plate or segment may correspond more or less to the width of a tooth of the toothing 16 and be V-shaped in the radial direction—as seen in plan view (not illustrated). In this case, if the orifices 30 are provided, they may be provided in them in the form of undercuts, e.g. in the region of the edge. However, a plate or a segment may also correspond to more than one tooth, e.g. two, three or four.

When a sinter powder is compressed by the tool 3 proposed by the invention, there is a risk that powder particles might get into these orifices 30 if they are provided, thereby making it impossible or more difficult to move and adjust the compacting element 11 by means of these orifices 30. In this situation, it is possible, within the scope of the invention, for these orifices 30 to be provided with an anti-friction coating, for example by means of rubberised regions or an anti-friction agent, such as a calibrating oil or polytetra-fluoroethylene or an anti-friction lacquer for example. This enables any powder that has penetrated these orifices 30 to be removed from them more easily, for example with air by blasting it out of the compacting element 11, and this blasting operation can be automated so that the compacting element 11 is blasted after every compaction step or after several compaction steps in the pressing device 1, to which end appropriate equipment is provided on the pressing device 1, for example a pressurised air connector with appropriate nozzles which are or can be directed towards the compacting element 11. Another option would be rinsing with a different fluid, e.g. a rinsing fluid.

Another way of preventing sinter powder from getting into these slot-shaped orifices 30 and/or to protect the toothing 16 of the compacting element 11 is to provide an insert element 36 over the toothing 16, as illustrated in FIG. 3. This insert element 36 may have a wall thickness of 2 mm, for example, and this wall thickness will depend on the strength of the material used for this purpose, but since this insert element 36 does not fulfil a support function it may be of a very slim design, and this insert element 36 should be adapted to the tooth flanks and should make the same movements as the flanks when the tool 3 is being set up in order to adapt to the desired geometry of the sintered component to be produced or sintered semi-finished product.

The V-shaped groove 28 also enables a bigger dimension to be imparted to the opening 14 so that bigger sintered components can be introduced into it.

Although not illustrated, at least one recess or cut-out may be provided in the tooth heads so as to prevent material flowing out during the compression process and making the teeth bigger.

The tool 3 illustrated in FIGS. 1 to 7 is suitable for producing external toothing on the sintered component to be produced. Since, in principle, it is also possible to produce so-called internal toothing, it is naturally also possible, within the scope of the invention, to opt for an arrangement in which the clamping element 10 is not disposed between the support element 9 and the compacting element 11 and instead, the compacting element 11 is disposed between the support element 9 and the clamping element 10 (in the radial direction).

It is also possible for a length or height of the compacting element 11 or the entire tool 3 to be so dimensioned in the axial direction that several sintered components, i.e. sintered semi-finished products, can be introduced into the tool 3, i.e. the openings 14 of the compacting element 11, and compressed and calibrated simultaneously. Dividing means, for example dividing sheets, separator plates or similar, may optionally be provided between the individual sintered components.

The absolute values of the angles of the oblique surfaces 12, 13, 18, 21 may be selected from a range with a lower limit of 2° and an upper limit of 30°. It is therefore possible to vary the force to be applied across the length of the displacement path.

Particularly in the case of the embodiment with the double cone insert, cylindrical contours can be produced by the oblique surfaces 12, 13, 18, 21 to a very high degree of accuracy and it is also possible to produce sintered components of a frustoconical design, for example bevel gears.

Not only does the tool proposed by the invention compact the peripheral zones, as is the case when using rollers for surface compaction in a manner known from the prior art, it is also possible to obtain at least more or less a full density in the sintered component, i.e. the proportion of pores in the sintered component is reduced to virtually zero.

Alternatively, it is also possible to set a density gradient starting from full density in the region of the toothing 16 to a lower density in the sintered component interior, in which case this density gradient may be based on a flat curve in particular.

It is of particular advantage to provide spring elements 27 if a relatively flat angle is desired for the oblique surfaces 12, 13, 18, 21, i.e. a flat inclination with respect to the normal in the axial direction, for example in the region of between 10° and 15°, since this assists with clamping of the compacting element 11.

Within the scope of the invention, it is also possible to provide several of these tools 3 proposed by the invention in the pressing device 1 and several pressing devices 1 disposed one after the other, in order to obtain close to full density, thereby enabling a compaction process in steps.

By means of these tools 3 proposed by the invention, the flanks of the teeth of the toothing 16 and the internal, open diameter of the tool can be moved by up to 20%.

When moving or setting the compacting element 11, it may be that individual ones of the slot-shaped orifices 30 taper, at least in the region of the opening 14 of the compacting element 11. Other ones may be such that the gap width remains unchanged by the clamping process.

Another possibility within the scope of the invention is for the displacement element to be provided with at least one orifice in the axial direction in the region of the shaping surface(s) in order to produce sintered components with a projection or at least one projection in the direction towards the mould cavity for producing sintered components with an undercut. This being the case, this or these orifice(s) and the projection/projections extend starting from the end face 34 in the direction towards the oppositely lying face of the compacting element 11 and may extend across only a part of the height or across the entire height of the compacting element 11.

Figure 8:
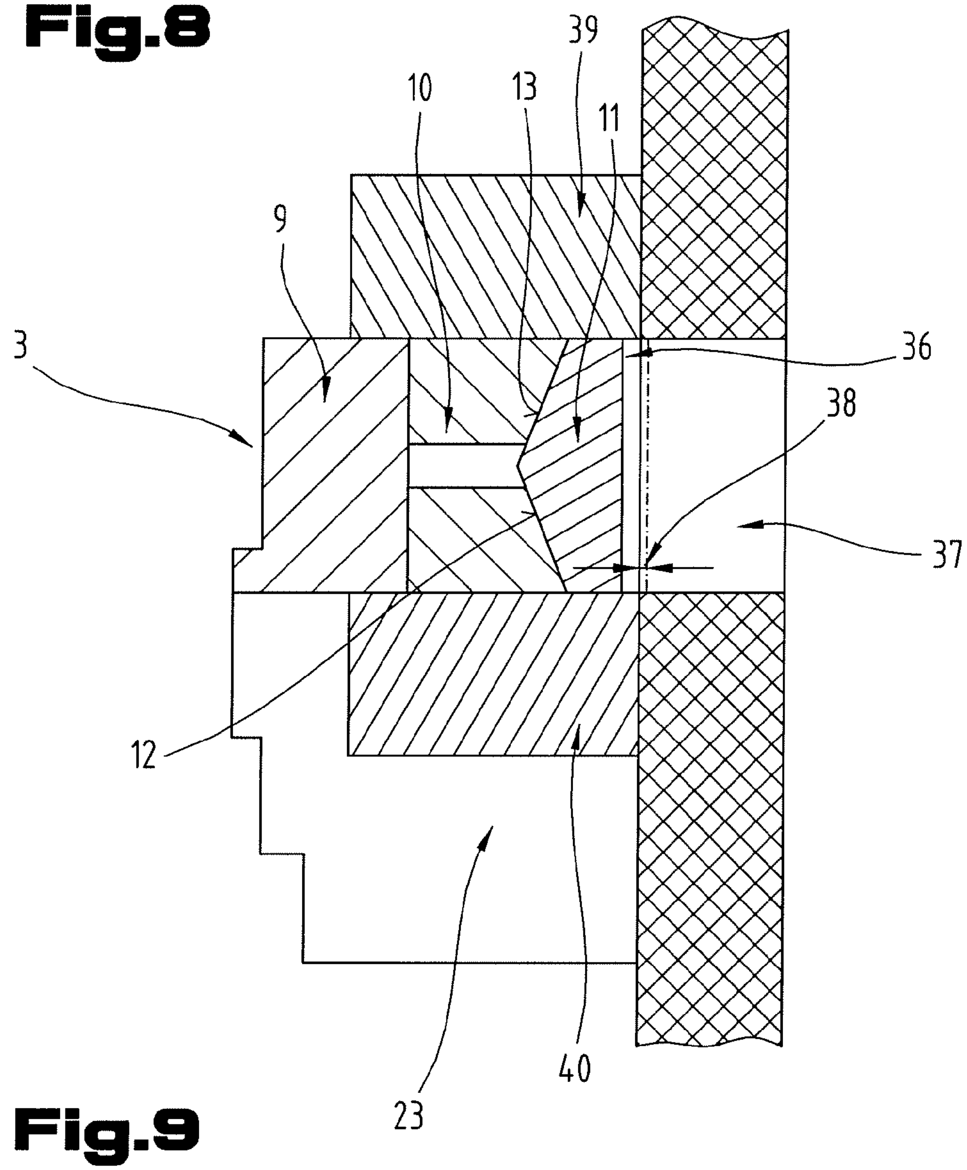
FIG. 8 is a side view in section showing a detail of an embodiment of a tool proposed by the invention.

FIG. 8 illustrates details of a different embodiment of the tool 3 proposed by the invention. It again has the support element 9, e.g. a supporting ring, the clamping element 10 with the two complementary oblique surfaces 12, 13 and, adjoining them—in the radial direction as viewed from the outside inwards—the compacting element 11 of a double cone design. The insert element 36 in the form of a sleeve is disposed on the compacting element 11 in this embodiment, pointing in the direction towards a mould cavity 37. Merely with a view to illustrating the principle, this sleeve is illustrated with a flat, straight surface, i.e. without any complex geometry. Naturally, the surface geometry is designed to complement the component to be produced and may be of any shape, which means that it is not just possible to make a sintered component in the shape of a simple ring. In terms of its wall thickness, this insert element 36 is dimensioned and made from an appropriately flexible material so that it also moves and does not prevent the change in diameter due to an adjustment of the relative position of the clamping element 10 with respect to the compacting element 11. FIG. 8 illustrates a width 38 of the displacement region provided for this purpose.

Unlike the embodiments described above, the variant illustrated in FIG. 8 is provided with a top and a bottom guide plate 39, 40, e.g. in the form of die plates, as a means of guiding the tool 3, in particular when the diameter is being adjusted and during pressing, which are disposed so that they cover the compacting element 11, the clamping element 10 and at least a part of the support element 9 in the radial direction. In addition, the bottom guide plate 40 can be accommodated by the support element part 23.

FIG. 8 is intended to make it clear that the invention is not limited to producing sintered components with toothing, for example switch gears and sliding couplings of transmissions, synchroniser rings, gears of pulley transmissions and gear drives, although these are generally included, e.g. oblique toothing, straight toothing, spur toothing, bevel toothing, etc., and represent the particular advantages of the tool 3, and instead, sintered components of any other design can be made to a high degree of precision and optionally to a high density.

In order to produce more complex surface geometries, e.g. undercuts on the sintered component, tool inserts may be provided which extend at least partially through the insert element 36 or, if one is not provided, through the compacting element 11.

Figure 9:
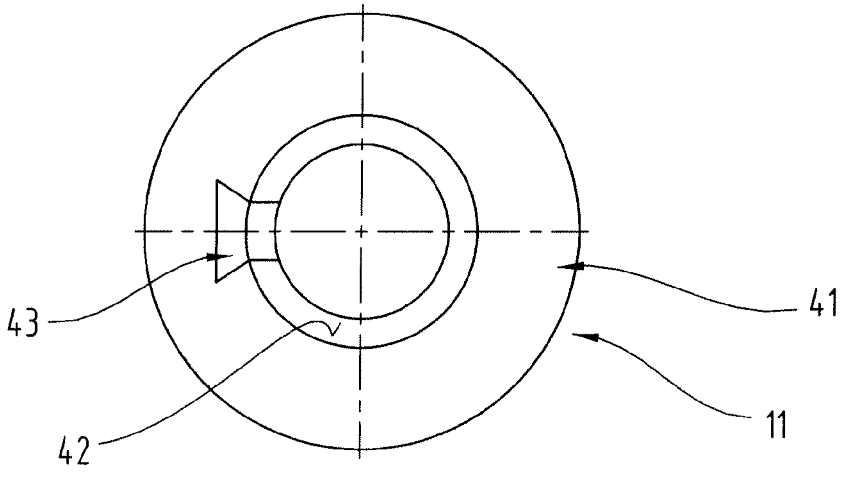
FIG. 9 is a plan view of a segmented tool.

FIG. 9 shows a plan view of one variant of the compacting element 11. It comprises four segments 41, which form a conical disc with an internal surface 42 of a conical shape when assembled. At least two of these segments 41 have a cut-out 43, which forms more or less at least half of a cut-out with a dovetail shape—as viewed from above—so that when the segments 41 are in the assembled state, these cut-outs 43 of two adjacent segments 41 form a cut-out with a dovetail shape in which a guide element with a cross-section matching the cut-out can be fitted. Naturally all the segments 41 could be provided with these cut-outs, although this is not illustrated.

Another alternative design would be to provide a projection on one segment 41 and a recess complementing it so that when the segments 41 are assembled, a projection locates in the recess of the adjacently disposed segments 41. In this respect too, it is also possible to opt for designs of a dovetail shape.

These features may also be used with the plates or segments described above.

Due to the design of the compacting element 11 based on plates or segments, a bigger adjustment range can be obtained than is the case with a compacting element 11 based on an integral design.

The cut-outs 43 need not necessarily have a cross-section based on a dovetail shape—as viewed from above—and different cross-sections may be selected instead.

Figure 10:
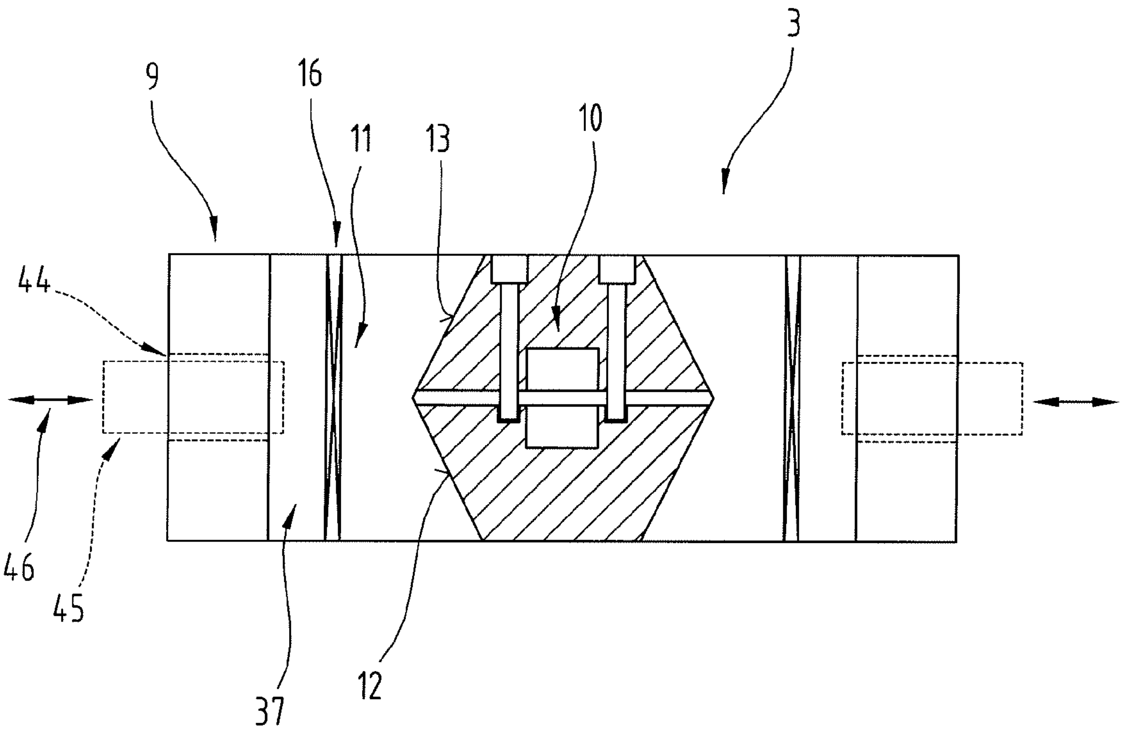
FIG. 10 is an embodiment of the tool for producing internal toothing.

FIG. 10 illustrates a variant of the tool 3 for producing sintered components with internal toothing. This tool has the support element 9, which may be annular in shape for example, the compacting element 11 in the form of a double cone insert and the clamping element 10 with the two oblique surfaces 12, 13 which actively co-operates with the compacting element 11. Disposed between the support element 9 and the compacting element 11 is the mould cavity 37, and the toothing 16 complementing the internal toothing to be produced is disposed on the surface of the compacting element 11 lying opposite the double cone-shaped surface. The clamping element 10 is therefore disposed centrally in the tool in this variant.

For details of other aspects of this variant, e.g. the disposition of the die plates, etc., reference may be made to the explanations given above in order to avoid unnecessary repetition.

The advantage of this variant is that undercuts, e.g. for producing coupling bodies, can be produced relatively easily by providing an orifice 44 in the support element 9, into which a tool insert 45 is introduced in order to produce the undercut, for example displaceable, segment-type ring elements, which can be pulled at least partially out of the tool 3, but at least out of the mould cavity 37—as indicated by double arrow 46—into the non-operating position in order to eject the sintered component, as indicated by broken lines in FIG. 10. These undercuts or cut-outs in the surface of the sintered component or orifices extending through the sintered component need not necessarily extend around the entire sintered component, as is the case with sliding couplings for automotive applications, and instead may be disposed in discrete regions of the sintered component by adapting the tool insert accordingly.

Figure 11:
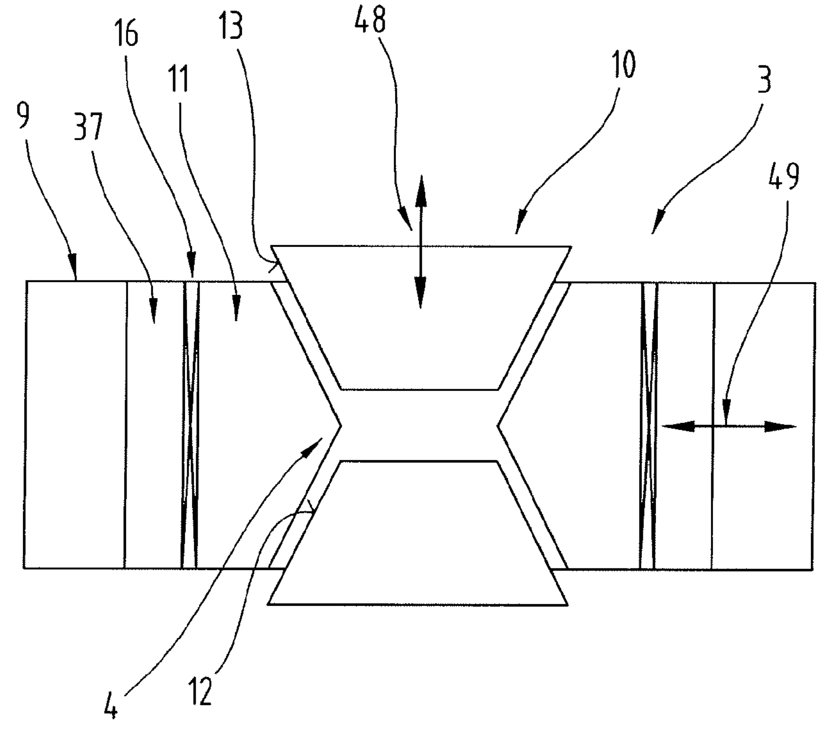
FIG. 11 is a side view in section showing an embodiment of the tool illustrated in FIG. 10 for producing internal toothing.

In a different variant from that shown in FIG. 10, FIG. 11 illustrates another possibility of producing a sintered component with internal toothing and a different geometric internal contour using the tool 3. In the case of this variant, the compacting element 11 is also provided in the form of a double cone element but its oblique surfaces run in the opposite direction of the embodiment illustrated in FIG. 10 forming a circumferentially extending edge 47 pointing in the direction towards the clamping element 10. The at least two-part clamping element 10 has the oblique surfaces 12, 13 complementing the oblique surfaces of the compacting element 11. The movement of the parts of the clamping element 10 in opposite directions indicated by the vertical double arrow 48 causes the movement of the compacting elements 11 indicated by the horizontal double arrow 49, in other words a radial pressing movement is generated by the axial machine movement, as with all the embodiments of the invention.

Figure 12:
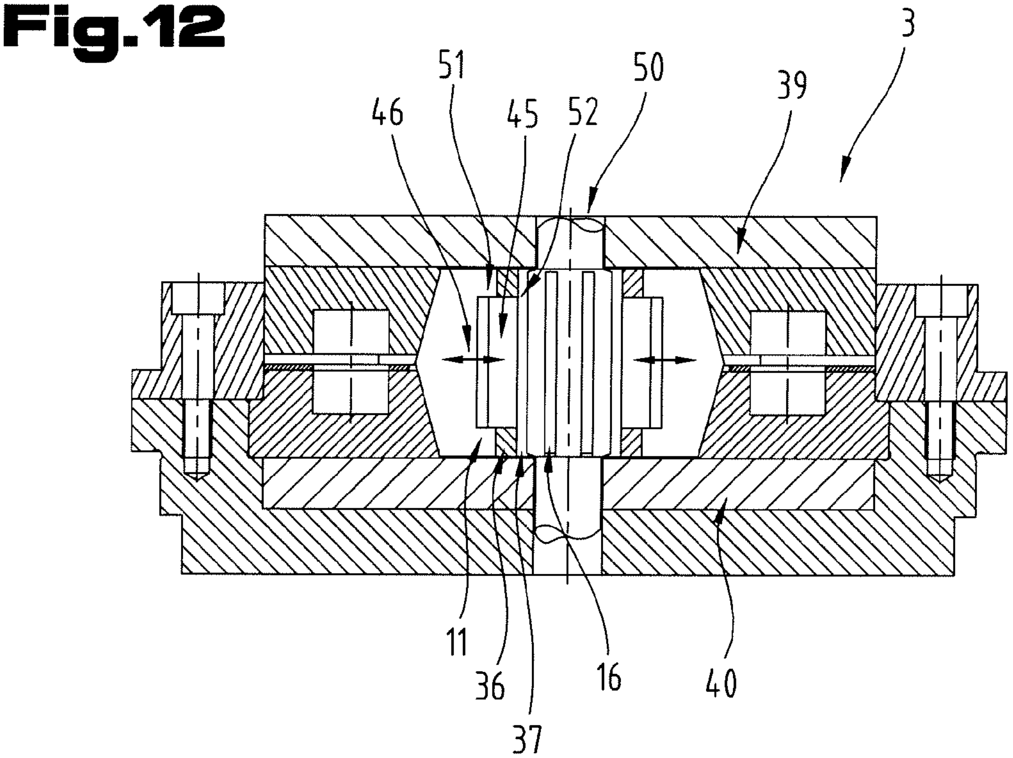
FIG. 12 is an embodiment of the invention for producing a sliding coupling.

FIG. 12, finally, illustrates one possible design of the tool 3 for producing a sliding coupling. In this instance, a corrugated shaping element 50 is provided at the centre, which has on its external surface the toothing 16 for forming the toothing of the sliding coupling. The mould cavity 37 is disposed between the insert element 36, which lies adjoining the compacting element 11, again in the form of a double cone, and this shaping element 50. Cut-outs 51, 52 are provided in the compacting element 11 as well as an insert element 36, in which the tool insert 45 can be radially displaced as indicated by double arrow 46 in order to form a circumferentially extending groove in the external end face of the sliding coupling. The shaping element 50 may be guided by the top and/or bottom guide plate 39, 40 or optionally may be formed on the top or bottom guide plate 39, 40.

Details of other features of the tool 3 may be found in the explanations given above. Within the scope of the invention, another option instead of an individual top and bottom guide plate 39, 40 is to provide several top and/or bottom guide plates 39, 40.

Figure 13:
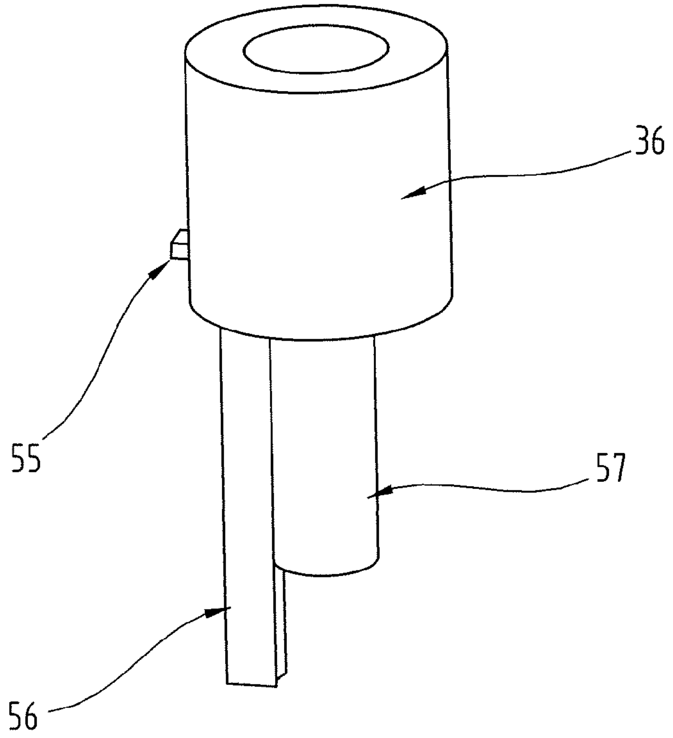
FIG. 13 is a view from an angle showing a punch for producing a sintered component with an internal orifice.
Figure 14:
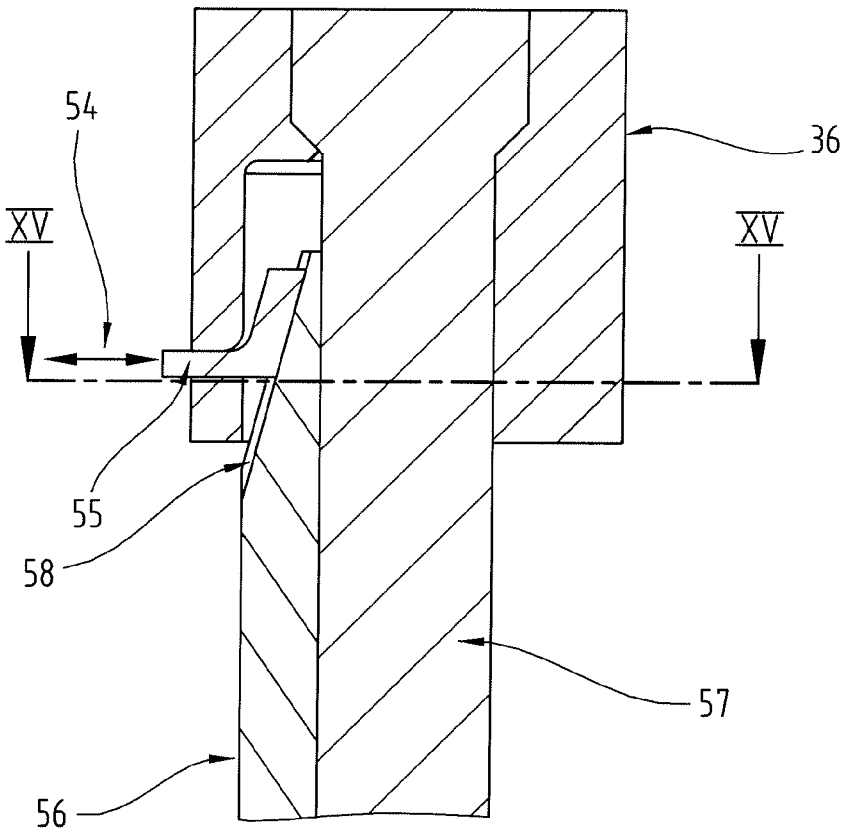
FIG. 14 is a side view in section showing the punch illustrated in FIG. 13.
Figure 15:
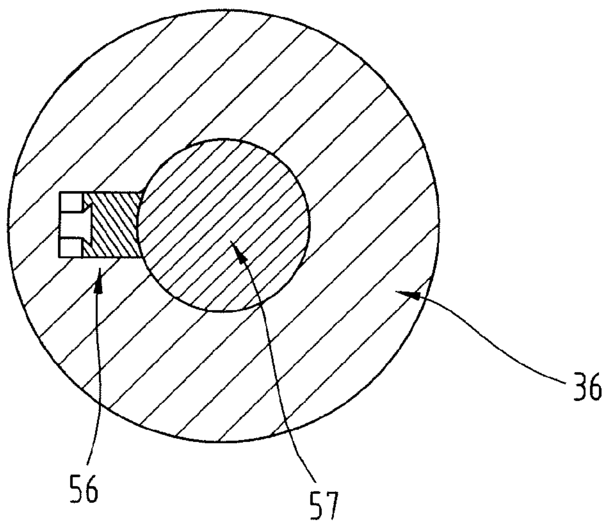
FIG. 15 is a plan view in section showing the punch illustrated in FIG. 13.
Figure 16:
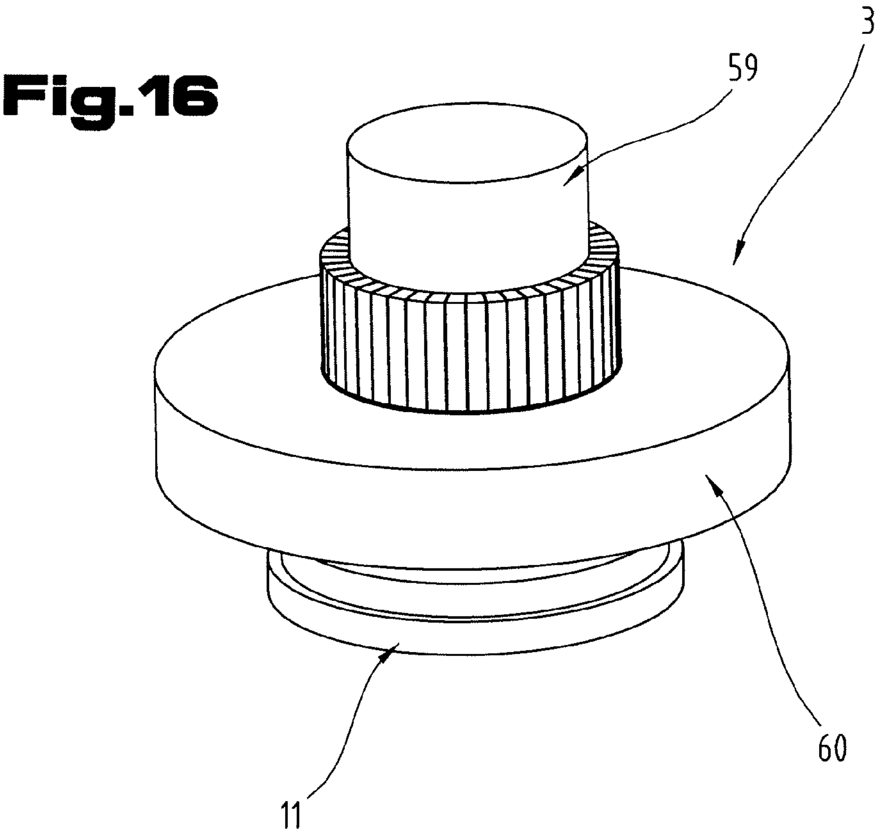
FIG. 16 is a view from an angle showing an embodiment of the tool for producing a sintered component with an undercut from inside.

A variant of the embodiment illustrated in FIG. 12 for producing a sintered component with an internal orifice, e.g. a coupling body of a transmission, is illustrated in FIGS. 13 to 15. In order to provide a clearer illustration, the entire tool 3 is not illustrated and only the parts relevant to producing the internal orifice are shown. Disposed in the sleeve-type insert element 36—although not illustrated—which may itself has a corresponding surface geometry for forming surface geometries of the sintered component, is at least one punch 55 extending through the insert element 36 which can be displaced horizontally as indicated by double arrow 54 on a displacement element 56. The displacement element 56 can in turn be displaced in the vertical direction on a holder 57, e.g., a core pin. Towards the holder of the insert element 36 on the sleeve holder 57, the latter may have a cross-sectional widening—as illustrated in the top part of FIG. 14—and the internal cut-out of the insert element 36 in which the holder 57 is disposed may be of a corresponding complementary design.

The punch 54 is of an approximately L-shaped design. The displacement element 56 is provided in the form of a conical strip. In the region where the punch 55 co-operates with the displacement element 56, the latter has a guide 58 for the punch 55, e.g. a web with a cross-section of a dovetail shape, in which a corresponding groove on the rear face of the punch 55 locates, or vice versa. This guide 58 is inclined towards the longitudinal mid-axis at an acute angle to it, as is the co-operating leg of the punch 55, so that an upward and downward movement of the displacement element 56 is converted into a radial movement of the punch 55 and the latter moves out of the insert element 36 and, in order to remove the sintered component from the mould, into it. An appropriate guide for the axial movement of the displacement element 57 may also be provided between it and the holder 57.

Naturally, it would also be possible to provide several such punches 55 in an insert element 36 in order to produce several internal orifices simultaneously, in which case these may be arranged in groups or may all be operated on a single displacement element 56, which in this case can surround the holder 57 in a sleeve-type arrangement, for example.

FIGS. 16 to 19 illustrate a variant of the tool 3 for producing a sintered component with an undercut from inside. This tool 3 comprises the compacting element 11, provided in the form of a conical punch in this embodiment, and a two-part clamping element 10 with a cone element 59 and splined disc 60. To keep the diagram simple, the tool holder is not illustrated. Also not illustrated is the workpiece holder, which may be provided in the form of a sleeve for example and may be disposed above the splined disc 60 forming the mould cavity 37 (not illustrated) extending round the compacting element 11.

Figure 19:
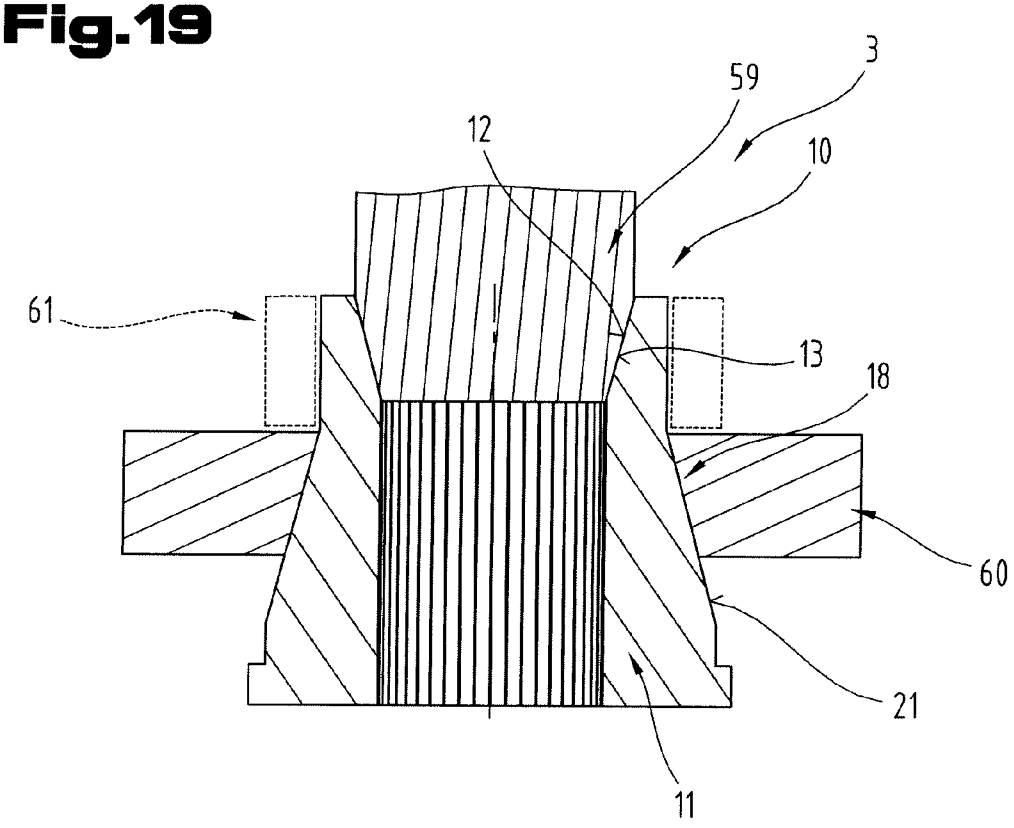
FIG. 19 is a section through the tool illustrated in FIG. 16.

The broken lines in FIG. 19 also indicate a workpiece 61 to be produced, in other words a sintered component.

This tool 3 may be used to produce internal toothing on a sintered component, for example, but, depending on the surface design of the compacting element 11 at the contact point with the workpiece 61, other sintered components may also be produced.

The clamping element 10 in this embodiment may essentially also be provide in the form of a "double cone element", although the two cones on the two components, cone element 59 and splined disc 60, forming the two clamping elements parts (19,20) mentioned above are split. In the region of where it locates in the compacting element 11, the cone element 59 has an external cone forming the oblique surface 12. In the top end region facing the cone element 59, the compacting element 11 as an internal cone forming the oblique surface 13, and the oblique surface 13 complements the oblique surface 12 of the external cone of the cone element 59. Underneath this region, the compacting element 11 is provided with an external cone, the oblique surface 21 of which complements the oblique surface 18 of the internal cone of the splined disc 60, which is actively connected to the compacting element 11 in this region so that the splined disc 60 can be axially displaced towards the external cone of the compacting element 11.

Figure 17:
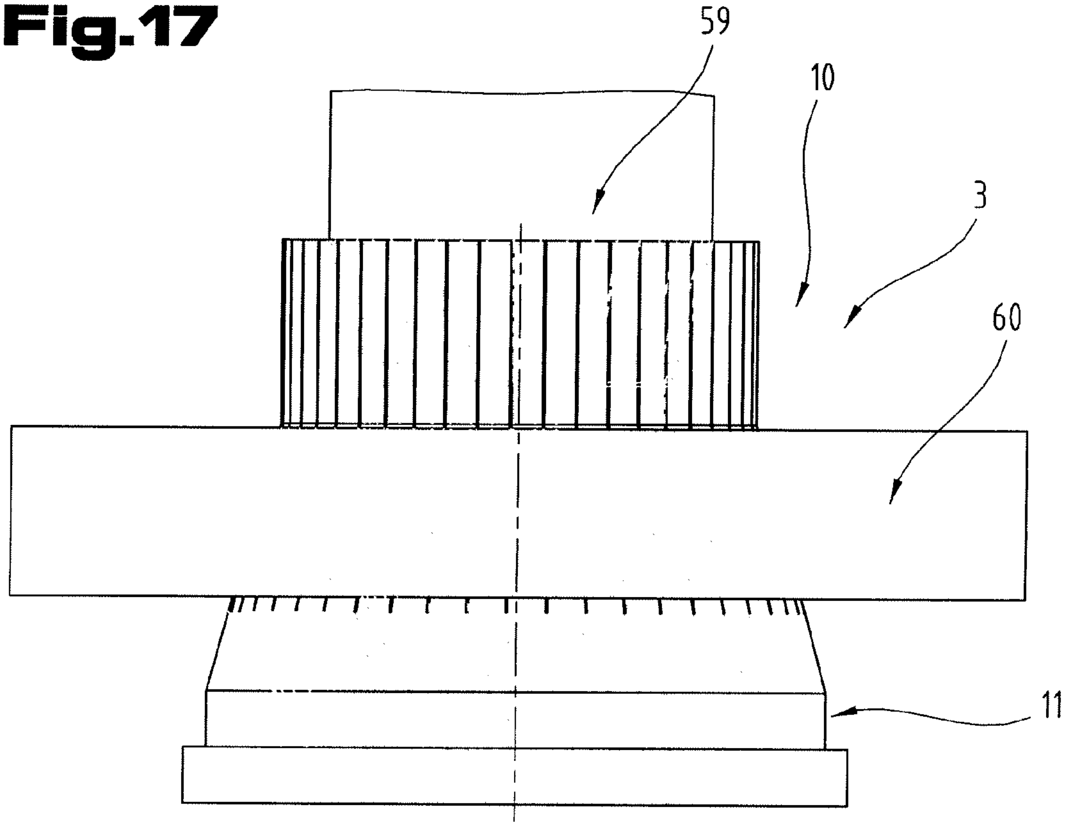
FIG. 17 is a side view showing the tool illustrated in FIG. 16.
Figure 18:
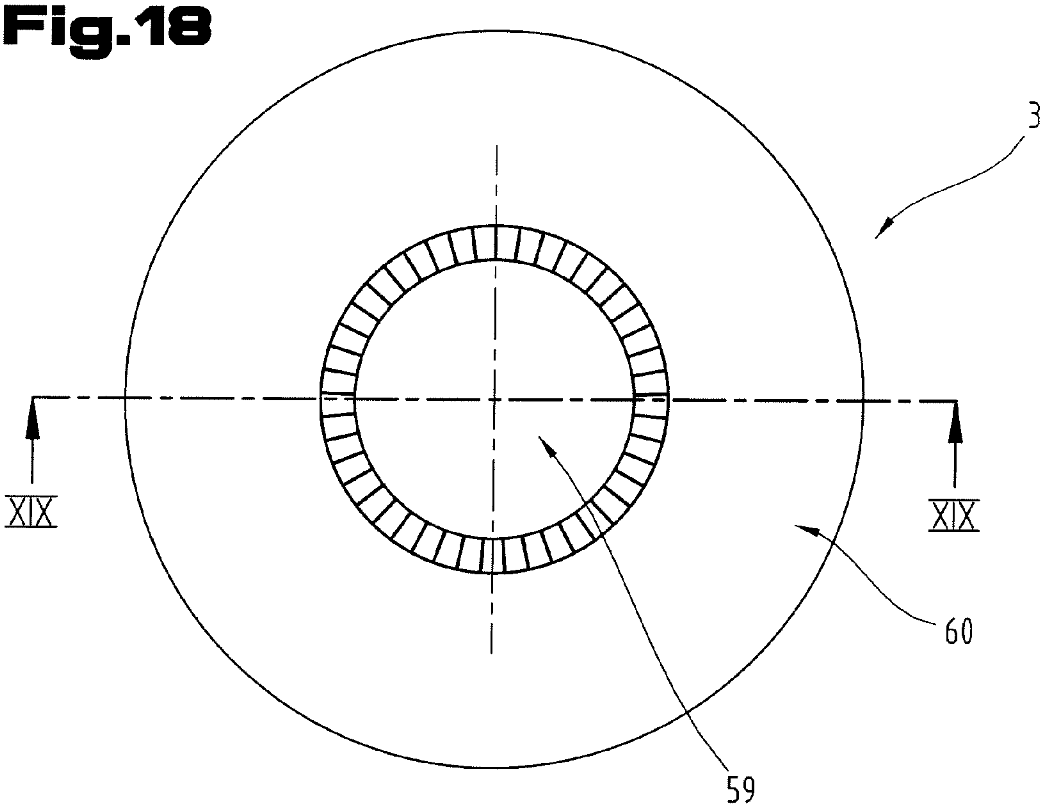
FIG. 18 is a plan view of the tool illustrated in FIG. 16.

As indicated by broken lines in FIG. 17, the compacting element 11 also has the orifices 30, so-called tension-releasing slots, for releasing radial tension. This enables the compacting element 11 to be moved radially.

The workpiece 61, i.e. the sintered component or the powder for the sintered component, is compacted due to the fact that the compacting element 11 is prised open at least in the region of the workpiece 61 and pushed against the retained workpiece 61 by means of the cone element 59 due to the axial displacement thereof. The splined disc 60 or the splined discs 60 if several are used, are "lifted" as this happens so that the radial movement the compacting element 11 is not obstructed. In order to remove the workpiece 61 from the mould, the cone element 59 is released from its engagement with the compacting element 11 and to this end, the diameter of the compacting element 11 is reduced again due to an axial movement of the splined disc(s) 60, releasing it from its engagement with the workpiece 61.

The compacting element 11 used with this variant of the tool 3 may also be made up of individual plates or segment, which are held together by means of the splined disc(s) 60.

An insert element 36, optionally incorporating a punch 55 may also be provided with this embodiment, in which case it is disposed between the sintered component to be produced and the compacting element 11.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

The embodiments illustrated as examples represent possible design variants of the tool 3, and it should be pointed out at this stage that the invention is not specifically limited to the design variants specifically illustrated, and instead the individual design variants may be used in different combinations with one another and these possible variations lie within the reach of the person skilled in this technical field given the disclosed technical teaching. Accordingly, all conceivable design variants which can be obtained by combining individual details of the variants described and illustrated are possible and fall within the scope of the invention.

For the sake of good order, finally, it should be pointed out that, in order to provide a clearer understanding of the structure of the tool 3, it and its constituent parts are illustrated to a certain extent out of scale and/or on an enlarged scale and/or on a reduced scale.

The objective underlying the independent inventive solutions may be found in the description.

Above all, the individual embodiments of the subject matter illustrated in FIGS. 1; 2; 3, 4, 5; 6, 7; 8; 9; 10; 11; 12; 13, 14, 15; 16, 17, 18, 19 constitute independent solutions proposed by the invention in their own right. The objectives and associated solutions proposed by the invention may be found in the detailed descriptions of these drawings.

List of reference numbers

| | |
|---|---|
| 1 | Pressing device |
| 2 | Press element |
| 3 | Tool |
| 4 | Bottom punch holder |
| 5 | Top punch holder |
| 6 | Tool holder |
| 7 | Post |
| 8 | Post |
| 9 | Support element |
| 10 | Clamping element |
| 11 | Compacting element |
| 12 | Surface |
| 13 | Surface |
| 14 | Opening |
| 15 | Surface |
| 16 | Toothing |
| 17 | Diameter |
| 18 | Surface |
| 19 | Clamping element part |
| 20 | Clamping element part |
| 21 | Surface |
| 22 | Receiving region |
| 23 | Support element part |
| 24 | Support element part |
| 25 | Screw |
| 26 | Guide element |
| 27 | Spring element |
| 28 | V-shaped groove |
| 29 | Guide element |
| 30 | Spring element |
| 31 | Addendum circle |
| 32 | Boundary surface |
| 33 | Root circle |
| 34 | End face |
| 35 | Bore |
| 36 | Insert element |
| 37 | Mould cavity |
| 38 | Width |
| 39 | Guide plate |
| 40 | Guide plate |
| 41 | Segment |
| 42 | Surface |
| 43 | Cut-out |
| 44 | Orifice |
| 45 | Tool insert |
| 46 | Double arrow |
| 47 | Edge |
| 48 | Double arrow |
| 49 | Double arrow |

-continued

| List of reference numbers | |
|---|---|
| 50 | Shaping element |
| 51 | Cut-out |
| 52 | Cut-out |
| 54 | Double arrow |
| 55 | Punch |
| 56 | Displacement element |
| 57 | Sleeve holder |
| 58 | Guide |
| 59 | Cone element |
| 60 | Splined disc |
| 61 | Workpiece |

The invention claimed is:

1. A tool for compacting a sintered component or a powder for the sintered component, with a clamping element and a compacting element which can be radially adjusted in terms of its dimensions and has a contact surface for the sintered component or powder, the surface of which complements the surface of the sintered component to be produced, and the clamping element has an oblique first surface and the compacting element has an oblique second surface complementing it and the first and the second oblique surface co-operate in order to prise apart and open or make smaller the compacting element, and the clamping element and/or the compacting element can be displaced in the axial direction, and a support element is provided if necessary, wherein the clamping element has at least one first clamping element part and at least one second clamping element part and at least one spring element is disposed between the first clamping element part and the second clamping element part.

2. The tool as claimed in claim 1, wherein at least one guide element is provided on or in the clamping element, which has an external thread which locates in an internal thread of the clamping element.

3. The tool as claimed in claim 1, wherein the first clamping element part and the second clamping element part are disposed one above the other in the axial direction, and the second clamping element part has another oblique surface which is inclined in the direction opposite that of the first oblique surface, and the compacting element has the second oblique surface and another oblique surface inclined in the direction opposite it, and the first oblique surface of the clamping element co-operates with second oblique surface of the compacting element and the other oblique surface of the clamping element co-operates with the other oblique surface of the compacting element.

4. The tool as claimed in claim 3, wherein the compacting element is provided in the form of a double cone element.

5. The tool as claimed in claim 1, wherein the spring element is provided in the form of spring bellows comprising an elastomer.

6. The tool as claimed in claim 3, wherein the first clamping element part is provided in the form of a cone element with an external cone and the second clamping element part is provided in the form of at least one splined disc with an internal cone, and the compacting element has an internal cone for locating with the external cone of the cone element and an external cone for locating with the splined disc(s).

7. The tool as claimed in claim 1, wherein at least one V-shaped groove is provided in the compacting element.

8. The tool as claimed in claim 1, wherein slot-shaped orifices extending in the radial direction are provided in the compacting element, at least individual ones of which optionally have a bore or cut-out in at least one of their ends in the axial direction with a diameter which is bigger than a width of the slot-shaped orifices.

9. The tool as claimed in claim 8, wherein the compacting element has toothing at its contact surface for the sintered component or powder with tooth heads and tooth roots disposed in between, which complement a toothing of the sintered component.

10. The tool as claimed in claim 9, wherein the slot-shaped orifices extend from a boundary surface of the compacting element lying opposite the toothing of the compacting element in the radial direction as far as a region of an addendum circle and/or root circle of the toothing of the compacting element.

11. The tool as claimed in claim 10, wherein the slot-shaped orifices extend in the region of the addendum circle of the compacting element in the radial direction stating from the boundary surface of the compacting element lying opposite the toothing of the compacting element in the radial direction but at most only as far as the region of the root circle.

12. The tool as claimed in claim 11, wherein the bores or cut-outs are provided in the axial direction at the ends of the slot-shaped orifices lying closest to the root circle of the toothing of the compacting element.

13. The tool as claimed in one of claim 12, wherein the slot-shaped orifices terminate in the region of the root circle before the boundary surface of the compacting element lying opposite the toothing of the compacting element in the radial direction.

14. The tool as claimed in claim 13, wherein a depth of the slot-shaped orifices in the axial direction extending into the region of the root circle is selected from a range of up to an upper limit of 10% of a total height of the compacting element in the axial direction.

15. The tool as claimed in claim 14, wherein at least individual ones of the slot-shaped orifices are provided with an anti-friction coating on at least certain regions of their surface.

16. The tool as claimed in claim 15, wherein the anti-friction coating is provided in the form of rubberised areas or by means of an anti-friction substance.

17. The tool as claimed in claim 1, wherein an insert element sleeve is provided over the contact surface of the compacting element for the sintered component or powder.

18. The tool as claimed in claim 17, wherein at least one cut-out is provided in the insert element and/or the compacting element for accommodating a tool insert for producing undercuts on the sintered component.

19. The tool as claimed in claim 9, wherein the tooth heads of the toothing of the compacting element are provided with a cut-out.

20. The tool as claimed in claim 1, wherein the compacting element is made up of individual plates or segments disposed adjacent to one another.

21. The tool as claimed in claim 20, wherein groove-shaped cut-outs having the shape of a dovetail, and raised areas complementing them are provided on the plates or segments.

22. The tool as claimed in claim 20, wherein the plates or segments have cut-outs in which the guide elements can be inserted.

23. The tool as claimed in claim 1, wherein the clamping element is disposed between the support element and the compacting element or the compacting element is disposed between the support element and the clamping element.

24. The tool as claimed in claim 3, wherein the oblique surfaces have an inclination with respect to a normal in the axial direction, the absolute value of which is selected from a range with a lower limit of 2° and an upper limit of 30°.

25. The tool as claimed in claim 1, wherein the compacting element is of a height in the axial direction which enables several sintered components to be introduced simultaneously.

26. A Pressing device for compacting a sintered component or a powder for the sintered component, with at least one press element for applying the compaction pressure and with a tool for compacting the sintered component or sinter powder, into which the sintered component can be introduced or which can be filled with the powder, and which is disposed between a top punch and a bottom punch, wherein the tool comprises a clamping element and a compacting element which can be radially adjusted in terms of its dimensions and has a contact surface for the sintered component or powder, the surface of which complements the surface of the sintered component to be produced, and the clamping element has an oblique first surface and the compacting element has an oblique second surface complementing it and the first and the second oblique surface co-operate in order to prise apart and open or make smaller the compacting element, and the clamping element and/or the compacting element can be displaced in the axial direction, and a support element is provided if necessary, wherein the clamping element has at least one first clamping element part and at least one second clamping element part and at least one spring element is disposed between the first clamping element part and the second clamping element part.

27. The pressing device as claimed in claim 26, wherein several tools are disposed one behind the other or one above the other.

28. The pressing device as claimed in claim 26, wherein the bottom punch has a V-shaped web which locates in a V-shaped groove provided on a surface of the tool.

29. The pressing device as claimed in claim 26, wherein guide elements are disposed above and/or underneath the tool, in particular die plates.

30. A tool for compacting a sintered component or a powder for the sintered component, with a clamping element and a compacting element which can be radially adjusted in terms of its dimensions and has a contact surface for the sintered component or powder, the surface of which complements the surface of the sintered component to be produced, and the clamping element has an oblique first surface and the compacting element has an oblique second surface complementing it and the first and the second oblique surface co-operate in order to prise apart and open or make smaller the compacting element, and the clamping element and/or the compacting element can be displaced in the axial direction, and a support element is provided if necessary, wherein the clamping element has at least one first clamping element part and at least one second clamping element part and wherein the first clamping element part is provided in the form of a cone element with an external cone and the second clamping element part is provided in the form of at least one splined disc with an internal cone, and the compacting element has an internal cone for locating with the external cone of the cone element and an external cone for locating with the splined disc(s).

* * * * *

UNITED STATES PATENT AND TRADEMARK OFFICE

CERTIFICATE OF CORRECTION

PATENT NO. : 8,167,602 B2
APPLICATION NO. : 12/270984
DATED : May 1, 2012
INVENTOR(S) : Johannes Hartner It is certified that error appears in the above-identified patent and that said Letters Patent is hereby corrected as shown below:

Title Page, Item (30), please delete “184/2007” and insert --1840/2007--
Title Page, Item (57), Abstract after “oblique” “surface” should read --surfaces--
Col. 1, Line 31, after “sintering” insert --,--
Col. 1, Line 47, after “oblique” “surface” should read --surfaces--
Col. 2, Line 5, after “components” “takes” should read --take--
Col. 2, Line 67, before “element” “double cone” should read --double-cone--
Col. 7, Line 53, before “expression” “sintered components” should read --sintered-components--
Col. 8, Line 15, before “element” “double cone” should read --double-cone--
Col. 10, Line 4, after “which” “extends” should read --extend--
Col. 12, Line 21, after “a” “double cone” should read --double-cone--
Col. 13, Line 24, before “insert” “double cone” should read --double-cone--
Col. 13, Line 58, before “element” “double cone” should read --double-cone--
Col. 14, Line 30, after “itself” “has” should read --have--
Col. 15, Line 16, after “be” “provide” should read --provided--
Col. 15, Line 16, before “element” “double cone” should read --double-cone--
Col. 15, Line 43, after “used” delete “,”
Col. 15, Line 44, after “movement” insert --of--
Col. 15, Line 56, after “produced” insert --,--
Col. 17, Line 25, after “oblique” “surface” should read --surfaces--
Col. 17, Line 48, after “with” insert --the--
Col. 17, Line 53, before “element” “double cone” should read --double-cone--
Col. 18, Line 17, after “direction” “stating” should read --starting--
Col. 18, Line 25, before “claim” delete “one of”
Col. 18, Line 37, after “their” “surface” should read --surfaces--
Col. 18, Line 57, after “them” insert --,--
Col. 19, Line 6, before “device” “Pressing” should read --pressing--
Col. 19, Line 20, after “oblique” “surface” should read --surfaces--
Col. 20, Line 15, after “oblique” “surface” should read --surfaces--

Signed and Sealed this
Twenty-sixth Day of March, 2013

Teresa Stanek Rea
*Acting Director of the United States Patent and Trademark Office*